US011391394B2

(12) United States Patent
Renard et al.

(10) Patent No.: US 11,391,394 B2
(45) Date of Patent: Jul. 19, 2022

(54) DEVICE FOR LAYING MAINS PIPES

(71) Applicant: ACIMEX, Saint Avertin (FR)

(72) Inventors: Pascal Renard, Bussy Saint Georges (FR); Julien Dhenne, Vernou sur Brenne (FR)

(73) Assignee: ACIMEX, Saint Avertin (FR)

( * ) Notice: Subject to any disclaimer, the term of this patent is extended or adjusted under 35 U.S.C. 154(b) by 0 days.

(21) Appl. No.: 17/261,957

(22) PCT Filed: Dec. 9, 2019

(86) PCT No.: PCT/FR2019/052959
§ 371 (c)(1),
(2) Date: Jan. 21, 2021

(87) PCT Pub. No.: WO2020/141266
PCT Pub. Date: Jul. 9, 2020

(65) Prior Publication Data
US 2021/0293355 A1    Sep. 23, 2021

(30) Foreign Application Priority Data
Jan. 3, 2019  (FR) ...................................... 1900037

(51) Int. Cl.
*F16L 1/09*       (2006.01)
*F16L 1/10*       (2006.01)
(Continued)

(52) U.S. Cl.
CPC ............ *F16L 1/028* (2013.01); *B66C 1/0243* (2013.01); *B66C 1/0287* (2013.01); *B66C 1/68* (2013.01);
(Continued)

(58) Field of Classification Search
CPC ..... F16L 1/028; F16L 1/09; F16L 1/20; B23P 19/10
(Continued)

(56) References Cited

U.S. PATENT DOCUMENTS 3,561,615 A * 2/1971 Forsberg ................... F16L 1/09
29/237
6,280,119 B1 * 8/2001 Ryan ....................... B66C 1/425
294/104

FOREIGN PATENT DOCUMENTS

DE    202008015603 U1    4/2009
DE    102009054325 B4    6/2010
(Continued)

OTHER PUBLICATIONS

International Search Report and Written Opinion for PCT/FR2019/052959, dated Apr. 17, 2020.
INPI search report for FR1900037 dated Nov. 18, 2019.

*Primary Examiner* — Sunil Singh
(74) *Attorney, Agent, or Firm* — Renner, Kenner, Greive, Bobak, Taylor & Weber

(57) ABSTRACT

A pipe laying device (T) connected to the jib (F) of a transport machine and carrying the pipe to be laid (T) to tight-fit it into a laid pipe (To).
This coupling head (1) comprises a vertical axis (YY) swiveling link (11) and a horizontal axis (Z) tilting link (12). It comprises a guide rail (2) with a bearing (21) for positioning and attachment to the end of the laid pipe (To) and aligning the pipe to be laid (T) with the laid pipe (To) and a carrier (3) forming a telescopic tube (30) tight-fitted to the guide rail (2) and operating in relation to it; the carrier (3) carries the pipe to be laid (T) and tight-fitted to the laid pipe (To).

(Continued)

The guide rail (2) is connected to the coupling head (1) through the telescopic tube (30).

17 Claims, 14 Drawing Sheets

(51) Int. Cl.
    *F16L 1/028*         (2006.01)
    *B66C 1/02*          (2006.01)
    *B66C 1/68*          (2006.01)
    *F16L 1/06*          (2006.01)

(52) U.S. Cl.
    CPC ................. *F16L 1/065* (2013.01); *F16L 1/09* (2013.01); *F16L 1/10* (2013.01)

(58) Field of Classification Search
    USPC ........................... 405/174, 184, 184.1–184.4
    See application file for complete search history.

(56) References Cited

FOREIGN PATENT DOCUMENTS

| | | | |
|---|---|---|---|
| EP | 1679462 | A2 | 7/2006 |
| EP | 1679462 | B1 | 7/2006 |
| FR | 2932240 | A1 | 11/2009 |
| FR | 2932240 | B1 | 12/2009 |
| WO | WO 87/01426 | * | 3/1987 |
| WO | WO 02/085575 | A2 * | 10/2002 |

\* cited by examiner

DEVICE FOR LAYING MAINS PIPES

FIELD OF THE INVENTION

The present invention relates to a pipe laying device which is connected to the boom of a transport machine carrying the pipe to be laid for insertion into a laid pipe, comprising: an attaching head in the form of a vertical swivel joint and a horizontal tilting joint, a guide rail with a support for positioning and fastening to the end of the laid pipe and aligning the pipe to be laid with the laid pipe, a carrier comprising a telescopic tube, tight-fitted to the guide rail, and actuated in relation to it and equipped with a support carrying the pipe to be laid and pushed into the pipe-laying socket fitting.

STATE OF THE ART

According to document FR 2 932 240, there is a known method of laying pipes assisted by a laying device 1 fitted to the articulated arm 2 of a lifting device 3 by means of a universal joint 4 allowing the device to be tilted in relation to the arm on a horizontal tilting axis and a slewing ring connected to a telescopic beam. This slewing ring allows the device to pivot around an axis, usually vertical.

The telescopic beam comprises a fixed part 5 fitted with a suction cup 7, fastened to the slewing ring 4' and a mobile part 6 also supporting a suction cup 8. The fixed part 5 bears and is fastened on the laid pipe to allow positioning and pulling of the mobile part 6 and for inserting the pipe it is carrying.

The handling of the pipe to be laid is difficult and imbalanced because the pipe is located almost completely on one side of the slewing ring and the universal joint which have to cater to a significant imbalance.

This total imbalance continues, even when the fixed part 5 is laid and secured to the laid pipe by its suction cup 7; there is even the risk of lifting or disturbing the already laid pipe.

Apart from this major issue of imbalance, requiring the oversizing of the device components, resulting in high weight and cost, the device does not allow accurate positioning in relation to the laid pipe or to know the exact conditions of insertion of the end of the new pipe.

In short, the laying operation is difficult and imprecise, an obstacle regarding the quality of the result. The components of the device must be sized to take into account the imbalance of the pipe to be laid, which increases in proportion to the length of the pipe.

This makes the equipment heavy and the raises its cost due to the essential oversizing.

Purpose of the Invention

This invention is aimed at developing a pipe laying device allowing the precise positioning of the device and of the pipe to be laid with respect to and already laid pipe, without disturbing the pipe or oversizing the equipment, by balancing the parts of the device with respect to its attachment at the end of the articulated arm of the supporting machine.

Outline and Advantages of the Invention

For this purpose, the invention is a pipe-laying device of the type defined above, characterized in that the guide rail is connected to the fastening head through the telescopic pipe. The pipe laying device according to the invention has the advantage that the telescopic pipe assembly formed by the guide rail and the telescopic pipe tight-fitted to the guide rail is held substantially close to the center of gravity of this assembly carrying the pipe to be laid. This arrangement offers many advantages for producing and operating the device for the approach, alignment, and positioning of the pipe to be laid.

Indeed, this relatively balanced fastening, possible since the pipes are generally of the same length, simplifies the construction of the swiveling and tilting joints which will be subjected only to very low stresses compared to those exerted on such joints in known devices. These joints can be reduced in size and thus in weight.

The joint actuators can also be smaller.

The movement of the telescopic tube from the carrier on the guide rail will hardly be exposed to any imbalanced forces since the telescopic tube with its load (the pipe to be laid) is supported on the guide rail on either side of the fastening of the guide rail to the coupling head. This is also advantageous for the guide rail which will no longer receive the cantilevered telescopic tube on only one side from its attachment to the coupling head.

The forces required to pivot and tilt the carrier with the pipe will be much lower and the maneuvers can be guided more precisely because the inertia of the load to be moved is lower. Another advantageous feature is that the guide rail is connected to the coupling head through a shaped hole cut out in the tube of the carrier.

The pair of holes of the telescopic tube does not weaken the tube and does not obstruct its mobility. The length of the holes corresponds approximately to the travel of the telescopic tube in relation to the guide rail, taking into account the distance between the attaching points of the coupling head and the guide rail. The telescopic tube rests on the guide rail on either side of the holes so that the forces are transmitted in a substantially balanced way between the tube and the rail, beyond the holes, with respect to the attachment of the rail to the coupling head.

Another advantageous feature for the bearing of the telescopic tube on the rail is that it has a slide bearing at its point of entry and a slide bearing on the other side of the hole, beyond the end of the rail corresponding to the maximum extension position of the telescopic tube in relation to the guide rail.

The slide bearings are brought into play in a very balanced way by the load of the pipe and the supported pipe, which is advantageous for contact between the parts and facilitating mobility, which is favorable for the precision of the positioning and laying maneuvers.

Another advantageous feature is that the guide rail and the telescopic tube have a rectangular cross-section, in fact a square cross-section, and the two sides each have a hole for attaching the guide rail to the coupling head.

This complementarity of the sections means that the contact surface between the two parts is large, whatever the direction of the forces to be transmitted during the maneuvering of the device.

Another advantageous characteristic of the guide rail is that, in addition to the carrier support, it has a positioning fork with an arch designed to move behind the socket fitting of the laid pipe and guide the precise positioning of the suction cup support at the end of the laid pipe.

This fork allows the precise approach of the guide rail before it is attached to the laid pipe. Approach is made even easier by the fact that the positioning fork is connected to the guide rail by a hole connection and a compression spring to press the arch against the laid pipe and to guide the downward movement of the guide rail and the support for positioning the rail and attaching it to the pipe by attaching the suction cup to the laid pipe.

Another advantageous characteristic is that the fork has an index for positioning the guide rail axially in relation to the entry plane of the laid pipe.

The index identifies the exact position of the entry plane of the socket fitting in relation to the carrier and therefore of the pipe to be laid.

The installation both of the guide rail on the previously laid pipe and the positioning of the carrier on the pipe to be laid, is made easier by the fact that the bearing of the rail and the support of the carrier each have a suction cup attaching device connected to a controlled vacuum source with each suction cup being respectively suspended under the rail or under the telescopic tube of the carrier by two fasteners, forming a limited-amplitude transverse articulation.

According to another advantageous characteristic, each attachment comprises a double lug through which a pin runs and attached respectively to the rail and to the tube, and to which a respective lug of the suction cups is connected with a lateral tilting play, by a shaft.

The tilting play is facilitated by the domes of the two parts through which the pin runs to hold the lug of the suction cup in place on the pin in the transverse direction while allowing it to tilt between the double lugs.

This tilting movement may be necessary to apply the suction cup to the pipe. But then, when the suction cup is applied, the forces generated between the suction cup and the guide rail or the suction cup and the telescopic rail, will necessarily bring the suction cups back into the vertical plane.

Advantageously, the suction head comprises:

a vertical axis swivel joint made of two parts one of which is integral with the attaching device fastened to the device, and the other of which is integral with the tilting joint, the tilting joint comprises two arms connected by a horizontal connecting pin, the first arm being integral with the second part of the swivel joint, and the second arm being integral with the guide rail, and these two arms being connected by a tilting actuator.

This combination, whose tilting joint is linked to the guide rail, reduces the overall height of the coupling head. This advantage is further accentuated by the fact that, according to another characteristic, the first arm is formed by two plates connected by the second part of the swivel joint and a shaft carrying the actuator and by the articulation shaft, the second arm being formed by two plates connected first to the shaft and second to a shaft of the actuator, these two plates being attached to the guide rail through the telescopic tube and leaving clear passage for the telescopic movement of the carrier tube.

The shape of the two arms and their assembly allows the two plates of the second arm to be attached to the guide rail on either side of the two sides of the telescopic tube, thus passing through its two holes. This attachment is at the base of the two plates using two relatively widely spaced attaching points, advantageous regarding the forces transmitted between the loaded telescopic tube and the two arms.

In an advantageous manner, to reduce the overall dimensional requirement, the telescopic tube houses an actuator which is supported on the rail and controls the movement of the carrier.

Since the telescopic tube is longer than the guide rail that enters into the telescopic tube, at the end, inside the tele- scopic tube, there is enough space to accommodate the actuator that drives the telescopic tube in relation to the guide rail.

As an advantageous characteristic, the end of the guide rail carries a front camera and the end of the telescopic tube, at its entry point receiving the guide rail, has an intermediate camera, while the front camera provides an image of the laid pipe to align the guide rail with it and while the intermediate camera providing an image of the pipe socket fitting to control the insertion of the pipe to be laid in the pipe socket fitting.

The cameras produce an image that is used to align the device with the pipe to be laid and to counteract the engagement of the end of the pipe to be laid in the socket fitting end of the laid pipe.

Another advantageous characteristic is that the telescopic tube is equipped with a support boom at the end opposite to the one receiving the guide rail, the boom being provided with a support carried by two side bars engaged in pairs of rollers carried by the two sides of the telescopic tube and an actuator installed on the telescopic tube and whose rod is connected to the support.

The support boom is an advantage in providing support for large pipes, much longer than the guide tube.

Conversely, this boom means that the length of the telescopic tube can be shortened to the most customary length to avoid too long a telescopic rail and nevertheless to be able to lay large diameter long telescopic tubes using this support boom.

According to an advantageous characteristic of the invention, it comprises a device for delocalizing the guide rail and the carrier for locating and recording the position of the pipe to be laid at the end of laying recording of the line made with the laid pipes and their function.

This geolocation of the pipe after laying is accurate since it concerns the pipe that has just been laid before the laying device is detached from the pipe. This confirms the precision of the installation location with the orientation of the laid pipe.

The localizing information for each laid pipe is combined and recorded to represent the line of the laid pipes and the location of their connections to one another. This topographical survey will be useful in the future for precise pipe work to avoid extensive, multiple, and expensive excavations.

BRIEF DESCRIPTION OF THE DRAWINGS

This invention is described in greater detail in the following, using the attached drawings in which:

FIG. 8A shows the initial positioning phase,

FIG. 8B is an image of the monitor screen for the initial positioning phase,

DESCRIPTION OF AN EMBODIMENT

Figure 1:
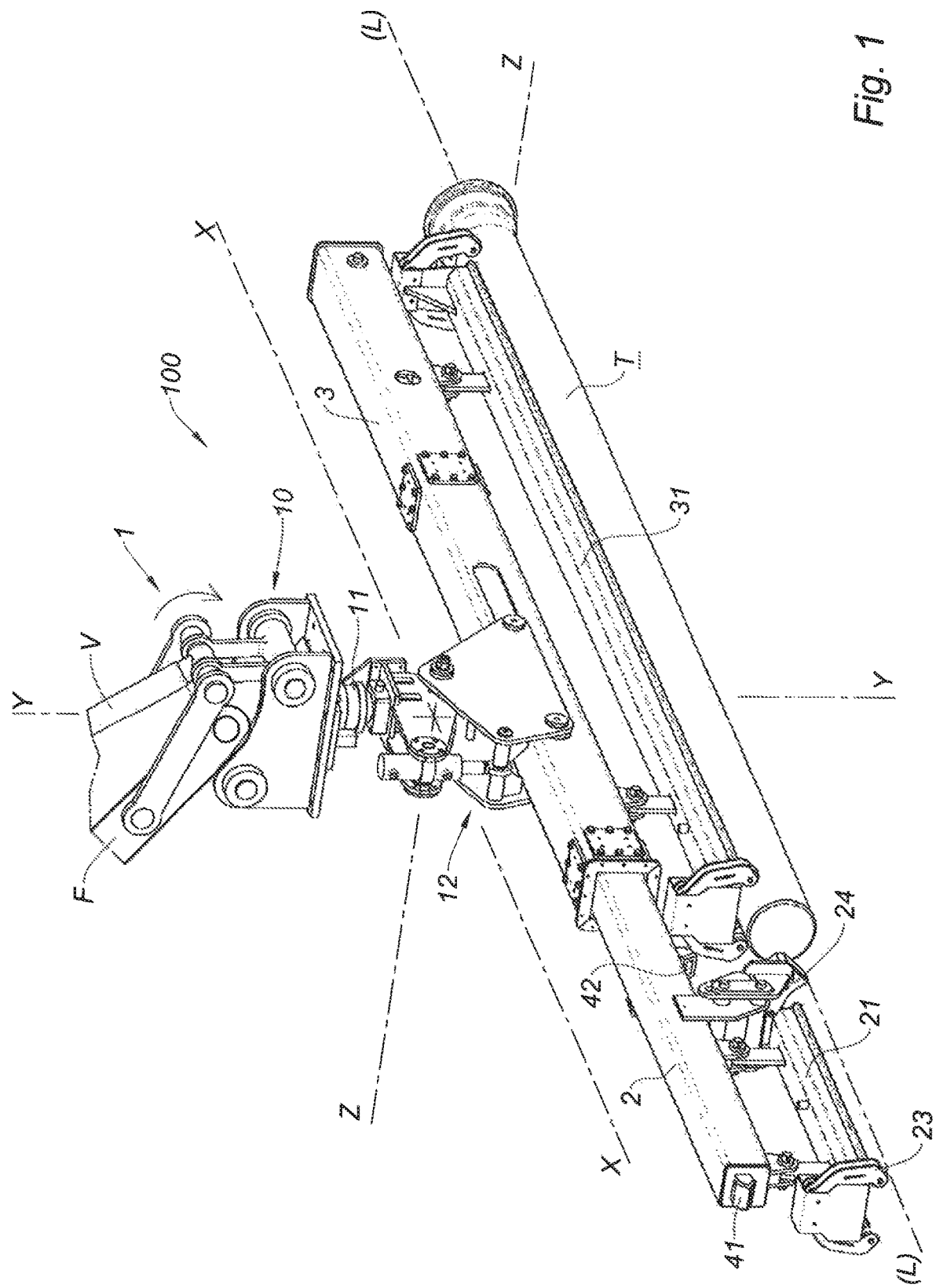
FIG. 1 is a schematic perspective view of a lifting device supporting a pipe laying device according to the invention.

According to FIG. 1, the purpose of the invention is a pipe component laying device 100 (pipes T). This device is supported by the articulated arm F, fitted with an actuator V of a public works machine. The pipe T supported by the device 100 must be installed and connected to an already laid pipe To which usually at the bottom of a trench.

To facilitate the description, an orthogonal reference system X, Y, Z will be used together with device 100 to define the various orientations controlled by the operator of device 100 using a joystick; the control is given according to data relating to device 100, that of the laid pipe To and of the laying environment, that is the trench; this data appears on the screen associated with the device 100, showing the identification of the laid pipe To by the cameras 41, 42 fitted to the device 100. Accordingly, the pipe to be laid T is first positioned in line with the laid pipe To using the front camera 41 and by engaging the pipe T in the socket fitting DTo of the laid pipe To in alignment with this pipe To by using the intermediate camera 42.

More specifically, the vertical YY axis is the articulation axis of the swivel of the device 100; the ZZ axis is the tilting axis; the XX axis is a horizontal reference axis perpendicular to the plane YY/ZZ and the LL axis is the axis of the pipe to be laid T. The laid pipe To not shown in this figure has the LoLo axis. The actuator capital the of the arm F maintains the YY axis vertically in the same way as the reference orientation to facilitate maneuvering around the ZZ axis and with respect to the direction XX which is, accordingly, horizontal. To simplify, in order to position the pipe T in the LoLo axis, the machine must maneuver its articulated arm F to bring the YY axis into the vertical plane containing the LoLo axis of the laid pipe To then pivot the device 100 with the pipe T, to bring the LL axis of pipe T into the vertical plane passing through the LoLo axis. This is done by maneuvering the swivel joint (YY axis) and lowering pipe T in this plane and then tilting by the articulation of tilting joint 12 so as to align the LL axis with the LoLo axis. This alignment is then adjusted by pressing the device 100 against pipe To and checking the accuracy of the alignment on the control screen. As soon as the alignment of LL to LoLo is complete, lock the guide rail 2 of device 100 on the pipe To and push the pipe T into its intended position as will later be described in detail.

The position of the pipe To has already been localized and the position of the pipe to be laid will be localized when the pipe T is in place. This allows a precise mapping of the pipe line which will greatly facilitate future work on the pipe, in particular allowing accurate, fast, and cost-effective excavations.

Figure 2:
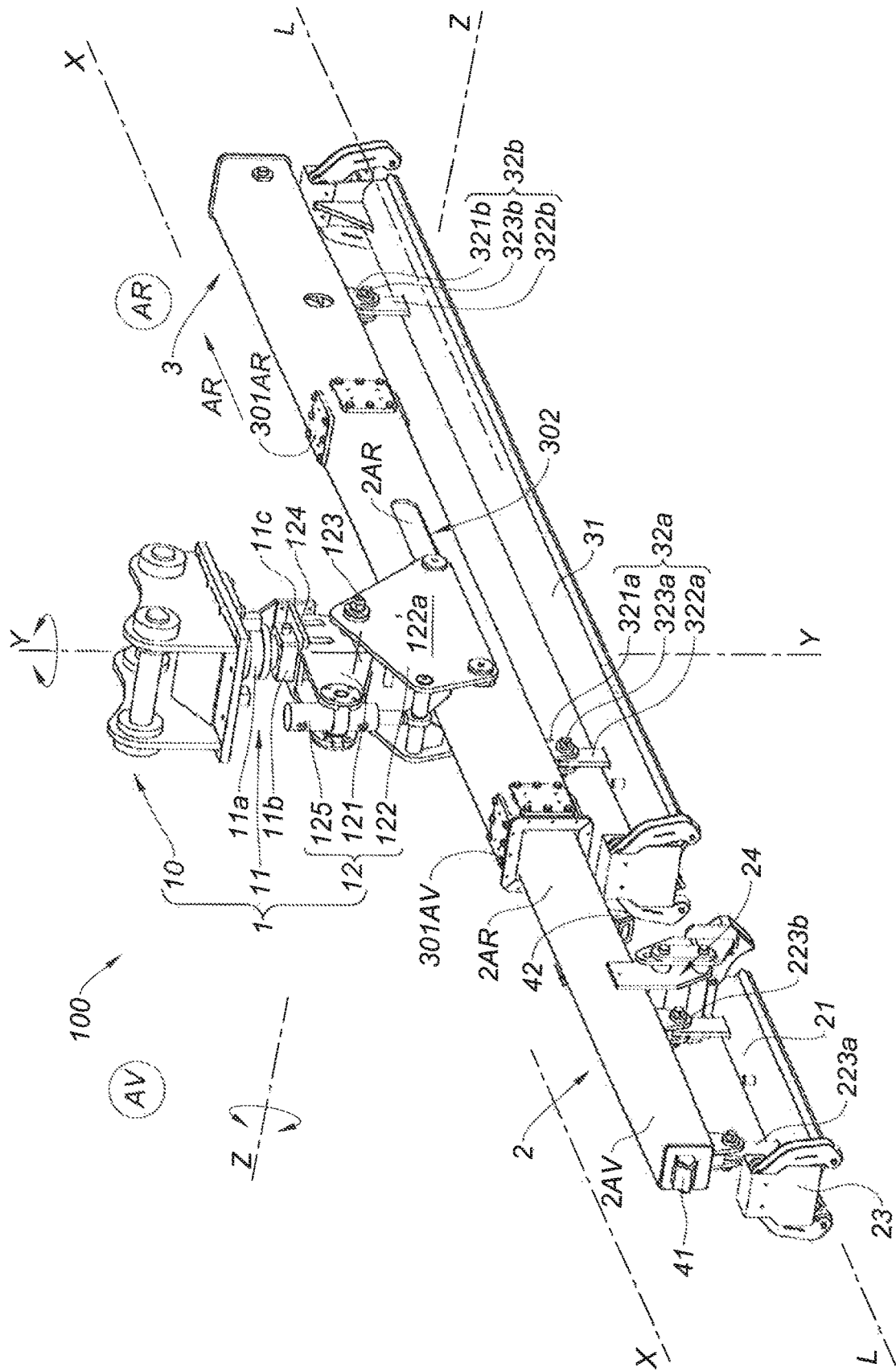
FIG. 2 is a perspective view of the laying device.
Figure 3:
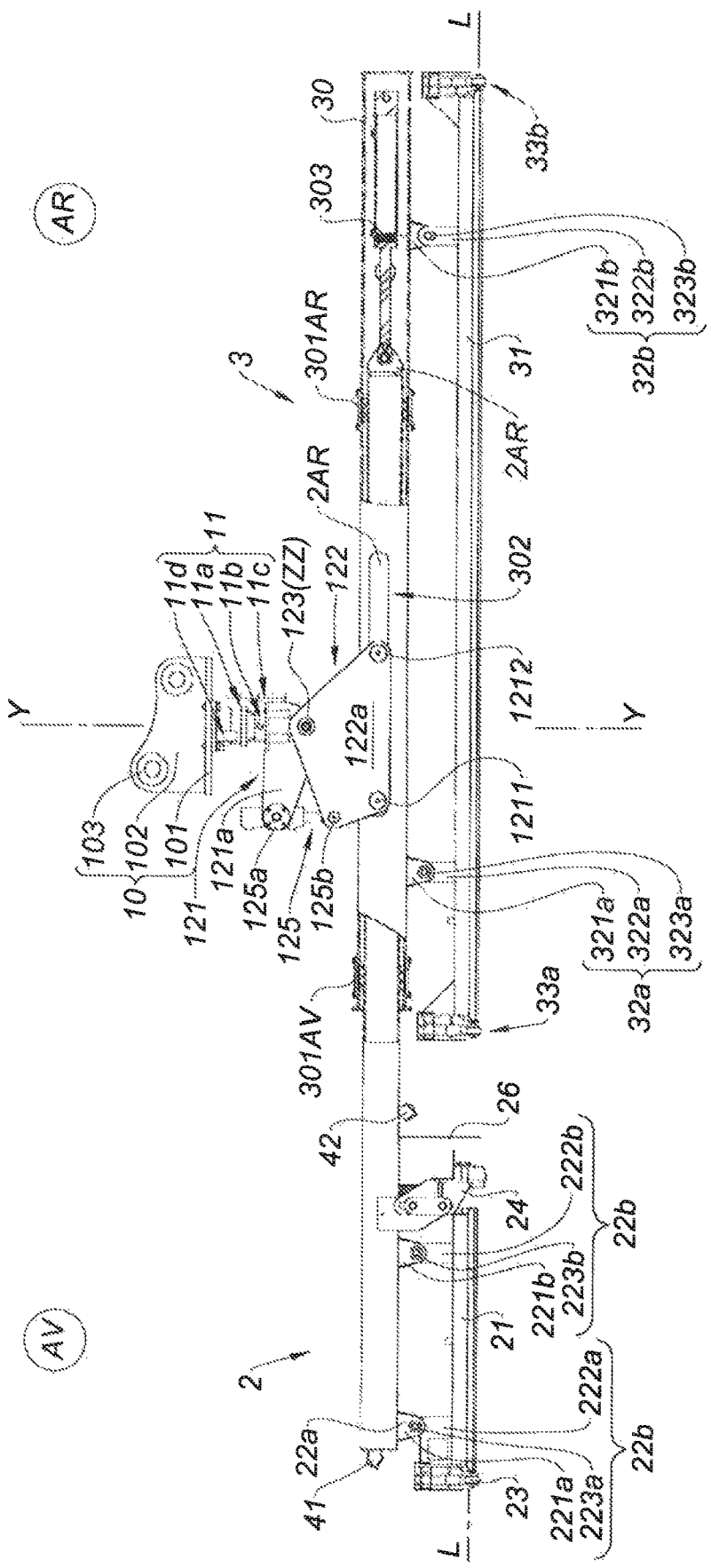
FIG. 3 is a side view of the laying device.

FIGS. 2 and 3 show the device 100 in a simplified form, limited to the only parts necessary for the basic description of the invention. The orthogonal references X, Y, Z, etc. have also been readjusted together with the front direction AV and rear direction AR on the XX axis and more generally the LL axis of the pipe to be laid T. The West pipe T is not shown in FIGS. 2, 3, but its LL axis, which is precisely associated with the device 100, is shown in the figures.

The laying device 100 comprises a coupling head 1 to be connected to the articulated arm F and to the machine actuator V. This head 1 carries a guide and positioning rail 2 of a carrier 3 carrying the pipe T which will be positioned in relation to the laid pipe To.

The coupling head 1 comprises a fastener 10 connected to a swivel joint 11, (YY axis), comprising a tilting joint 12 (ZZ axis) supporting the guide rail 2 and the pipe T.

The swivel joint 12 is connected securely to the guide rail 2 to be attached to pipe To after its positioning (its orientation in relation to the pipe To). The guide rail 2 supports the carrier 3 in the form of a tube 30, which is telescopically tight-fitted onto the guide rail 2, holding the pipe T with a suction cup 31.

In more detail, the fastener 10 is then attached to a complementary device, not shown in these figures, at the end of the articulated arm F receiving the fastener 10. Fastener 10 is rotationally integral with the articulated arm F and maintains this orientation around the vertical direction YY.

In this example, the fastener 10 is a plate 101 with two parallel walls 102, through which the studs 103 pass for connection to the complementary device and to the actuator V of the articulated arm F. The plate 101 carries the swivel joint 11, a rotary, hydraulic, actuator which is not shown. Its axis defines the geometrical YY axis. The swivel joint 11 is made of two parts, one part 11 a connected to the plate 101 of the fastener 10 and the other 11b to the tilting joint 12 comprising two arms 121, 122. The arm 121 carries a swiveling stop 11 c attached to pivot on the part 11 b and protruding upwards; the underside of the plate 101 has a counter-stop 11. This counter-stop 11 is integral with part 11 and limits the swiveling around YY axis.

The swivel joint 11 is attached to the first arm 121 of the swivel joint 12 by its part 11 b; the first arm 121 is connected to the second arm 122 by a shaft 123 defining the geometric ZZ axis. The first arm 121 comprises two plates 121a bearing the axis 123 and joined at the top by a plate 124 attached to the second arm 122 by the second part 11 b of the swivel joint 11.

The pin 123 is located on arm 121 so that its geometrical ZZ axis intersects the geometrical YY axis perpendicularly.

The two plates 121a are triangular in shape with plate 124 near one of the apexes, the other apex being occupied by pin 123 and the third apex by a pin 125a carrying the actuator 125 which controls this tilting joint 12.

The second arm 122 also comprises two plates 122a forming a quadrangle receiving between them the first arm 121; the second arm 122 is assembled to the first arm 121 by the pin 123 and by the pin 125a of the actuator 125 also carried by the two plates 122a at one of their apexes.

The two other apexes define one side of the arm 122. These two apexes are occupied by attaching points 1221, 1222 held apart and carried by the guide rail 2. The attaching points incorporate screwed connections to allow the assembly/disassembly of the second arm 122 with respect to the guide rail 2 through the hole 312 of the telescopic tube 31 of carrier 3, as will be seen later.

Through this assembly, the guide rail 2 tilts integrally with the second arm 122 and swivels integrally with the second part 11b of the swivel joint 11 by means of the tilting joint 12. In this example, the body 1251 of actuator 125 supports the pin 125a connecting the two plates 121a and its rod 1252 is connected to axis 125b. This arrangement simplifies the connection of the actuator 125 from the coupling head 1.

The guide rail 2, supported by the coupling head 1, is a square section tube whose length, partly concealed, is sufficient to guide the movement of the carrier 3 carrying the pipe T in the standby position, and also to ensure that its weight is distributed substantially equally on either side of the YY axis, in balance. In this standby position, carrier 3 carries the pipe T the end of which is far enough away from the part of the rail 2 to be tight-fitted on the pipe To allow this approach and positioning maneuver in relation to the pipe To.

The front end 2AV of the rail 2 is equipped with two fasteners 22a, 22b carrying an extended suction cup 21, to cover a certain length of the top of the pipe To and to be attached to it by depression. On the front, the suction cup 21 has a guide fork 23 with rollers for resting on the top of the pipe To and to allow its downwards guidance until the suction cup 21 is put in place. The two fasteners 22a, 22b are each formed by a double lug 221a, 221b integral with the bottom of rail 2 and receiving between one another a lug 222a and 222b integral with the top of the suction cup 21.

The double lugs 221a, 221b of the suction cup 21a are passed with some play by the transversal pin 223a,b in the form of a pin connecting the fixed double lugs 221 underneath the rail 2, leaving some freedom to tilt in this transversal direction.

The front guide 23, is integral with the front lug 222a of suction cup 21.

Figure 4A:
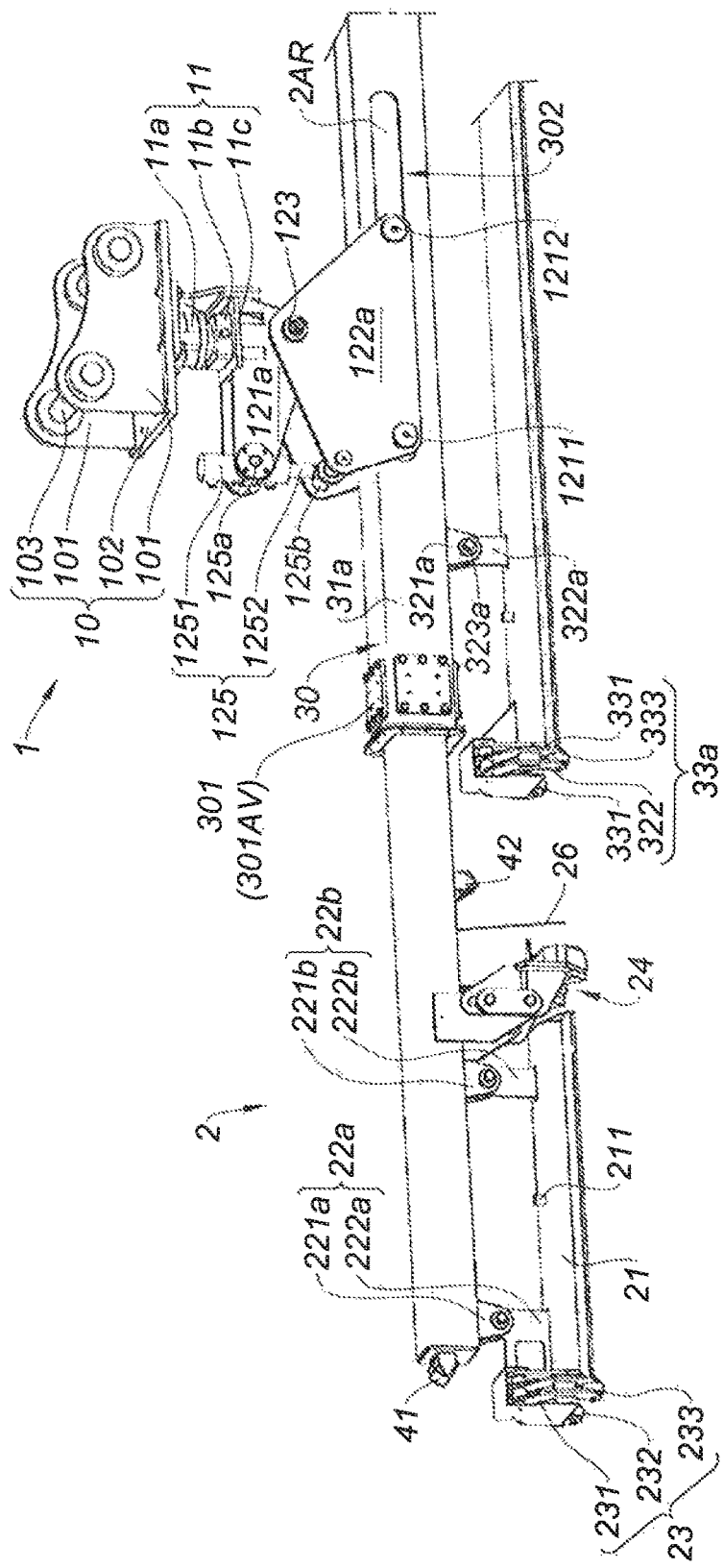
FIG. 4A is an enlarged scale view of the device comprising the coupling head and the guide rail.
Figure 4B:
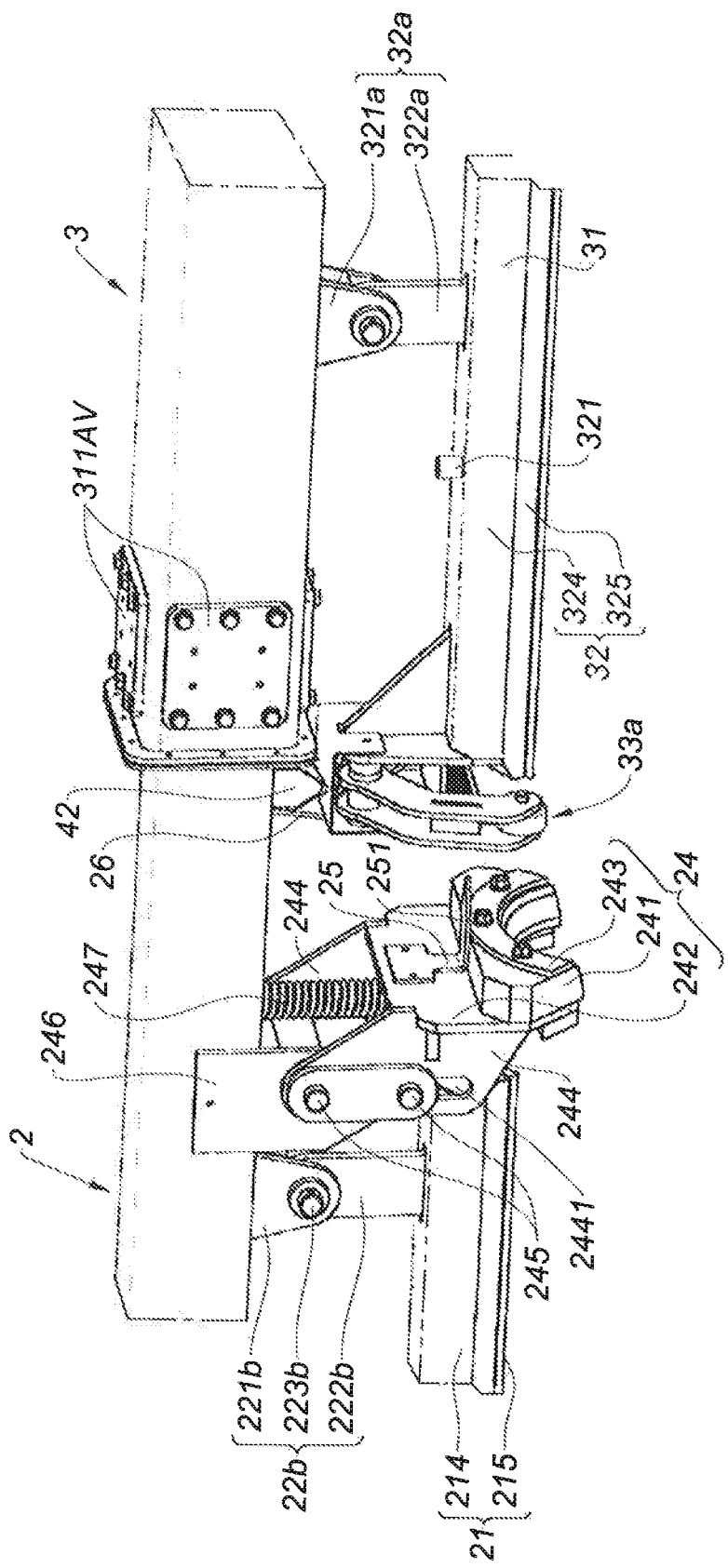
FIG. 4B is a perspective view of the positioning fork and the nearby components of the laying device.

The other attachment 22b is in front of a positioning fork 24 attached to rail 2 and whose description is given in FIGS. 4A, 4B.

The carrier 3 is made of a square section tube 30, which is tight-fitted telescopically on the tube forming the rail 2. The tube 30 is equipped with internal bearings 301AV on its four faces at its front end and internal bearings 301AR towards the rear beyond the (variable) position of the second arm 122 attachment of the swivel point. The dimensions of guide rail 2 are based on bearings 301AV, 301AR, regardless of the telescopic adjustment position of carrier 3 relative to guide rail 2.

The pipe 30 has two extended cutout holes, forming 302 holes, through which the rear part 2AR of guide rail 2 appears. The two holes 302 are oriented towards the LL axis to allow the free passage of the attaching points 1211, 1212 of the guide rail 2 to the two plates 122a of the second arm 122.

The holes 302 are provided in the two lateral faces of the pipe 30. Thus, the two plates 122a of the second arm 122 overlap the tube 30 and are connected to the rear part 2AR of the guide rail 2.

The underside of pipe 30 is provided with two fasteners 32a, 32b with double lugs 321a, 321b carrying the suction cup 31 receiving the pipe T.

The body of this suction cup 31 is connected to the double lugs 321a, 321b by a lug 322a, 322b and a pin 323a, 323b near the front and rear end of the suction cup, provided respectively with guide forks 33a, 33b. The movement of the carrier 3 in relation to the guide rail 2 is controlled by an actuator 303 housed in the pipe 30 behind the rear end 2AR of the guide rail 2. This actuator 303 is installed in pipe 30 through a hatch in the top of pipe 30.

The partial sectional view through a vertical plane passing through the LL axis (FIG. 3) shows the internal structure of pipe 30 actuated by actuator 30.

The geometry of the telescopic assembly formed by the guide rail 2 and the telescopic tube 30 of the carrier 3 carrying the pipe T allows the link (1221, 1222) between the guide rail 2 and the coupling head to be placed in the best balanced position for the assembly 1, 3 carrying the pipe T. The pair of holes 302 will be made to suit this near-balanced attaching position and the length of the pairs of holes will depend on the relative travel of the telescopic tube 30 in relation to the attaching points 1221, 1222. The possible travel is the length of each hole 302 that remains free beyond the attachment points 1221, 1222. This travel is the travel necessary to position the guide rail 2 on the pipe to be laid To without this preparatory maneuver being generated by the end of the pipe to be laid T, attached to the carrier 3. This safety distance can be around a few tens of centimeters, determining the available length of the holes. This also defines the position of the bearings between the guide rail 2 and the telescopic tube 30 as well as the maximum length of the rail 2 in the telescopic tube 30.

According to FIGS. 2, 3, 4A, 4B, the front guide 23 of rail 2 and the front and rear guides 33a, 33b of carrier 3 have the same function and structure. The view of the two guides 23, 33a,b in two opposite directions according to FIGS. 4A, 4B shows their structure. They are integral with the body of suction cup 21 or suction cup 31. Each of the guides 23, 33a, 33b comprises two curved swiveling arms 231, 331, each formed by two twin blades 232, 332 and each provided with a roller 233, 333. The arms 231, 331 are brought together by a spring, not shown, and they move apart on contact with the pipe To, T when the suction cup 21 or 31 is lowered onto on the pipe To, T.

Each suction cup 21, 31 is made of a rigid top 214, 314 with a sealing lip 215, 315 underneath, forming a rectangular bead, designed to rest on the top of the pipe To, T to delimit rectangular sealed surfaces, curved on the pipe To, T and to be crushed when the suction cup 21, 31 is applied against the pipe and held by depression.

The positioning fork 24 shown in the views of FIGS. 4A, 4B is a jumper-shaped part; it is intended to be positioned on the end of the pipe To behind its socket fitting DTo to define the position for attaching the guide rail 2 on the pipe To and to guarantee the alignment or the near alignment of the geometrical LL axis with the geometrical LoLo axis of the pipe To.

The fork 24 comprises a contact arch 241, with a section adapted to that of the pipe To laid in an arch which is less than half. The arch 241 is cut from a piece of plastic and is supported by a support 242 leaving the contact surface free. The interchangeable arch 241 is bolted to the support 242 and supported by a counter arch 243.

The support 242 is a plate attached to two guide plates 244, each having a hole 2441, which is crossed by two guide pins 245. These pins 245 are carried by two lugs 246 descending from the sides of guide rail 2 A compression spring 247 is supported between support 242 and guide rail 2 to push the support 242 into the lower position at the travel end of the two holes 2441. When this positioning fork 24 reaches the installed pipe To, it pushes guide rail 2 down to the travel end position of the two parallel holes 2441, thus defining the reference position of the guide rail 2 on the laid pipe To.

The downward positioning (vertical direction YY) of the rail 2 is also adjusted to the longitudinal position in relation to the pipe To using an index 25 supported by the arch 241 and whose tip 251 defines the opening plane of this pipe To. The rail 2 also has an advanced stop 26 on the carrier 3 carrying the pipe T, comprising a beam emitted from the underside of the guide rail 2. This vertical stop 26 is used to adjust the tight-fitting length of the end of the pipe T in the pipe to be laid To. For this purpose, the carrier 3 moves forward until the front end of pipe T meets the light barrier from this stop 26. The insertion movement is then counted (calculated) from this position and as per the requirements for assembling this type of pipe T in the laid pipe To.

FIGS. 4A, 4B also show the end fittings 211, 321 of the suction caps 21, 31 connected by pipes (not shown) to the vacuum source, controlled to secure the suction cups 21, 31 by depression on the pipes to, T or to release the grip.

Figure 5:
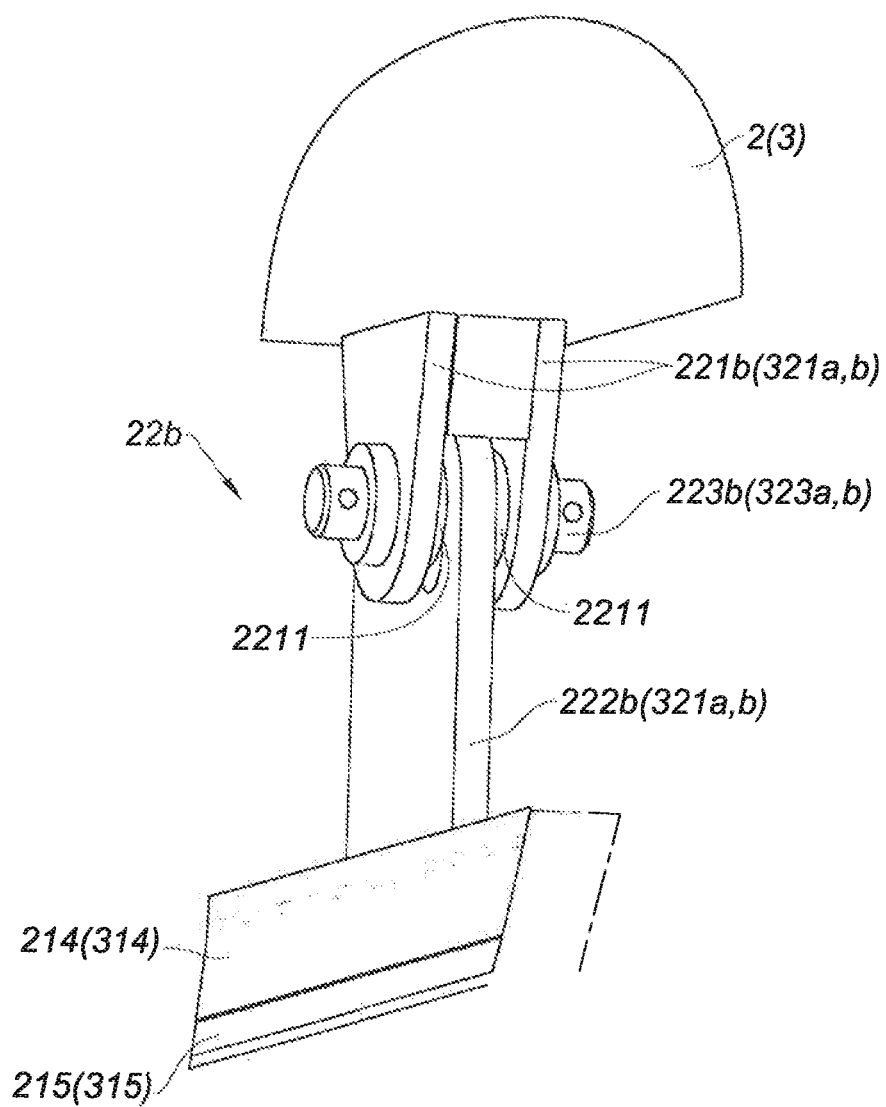
FIG. 5 is a perspective view of a detail of the suction cap attachment

FIG. 5 shows a suction cup attachment, both that 22 of the suction cup 21 on the rail 2 on the pipe To and that 32 of the suction cup 31 supporting the pipe T. This attachment is described with the references of the fastener 22bq of suction cup 21. The attachment 22 is formed from the double lug 221b attached to the underside of the rail 2 and receiving the lug 222b attached to the suction cup 21; the pin 223b passes through the assembly. In order to have the transverse degree of freedom to allow a transverse adaptation tilting of the suction cup 21 on the pipe To, the lugs 221b are not supported, surface to surface, with the lug 222b but through the domes 2211 on their sides facing the lug 222. Axis 223b shaft is removable to allow for the simple installation of a suction cup with its section adapted to the diameter of the pipes to be laid T. The various attachments of the suction cups 21, 32 have the same structure and will not be described in each case.

Figure 6:
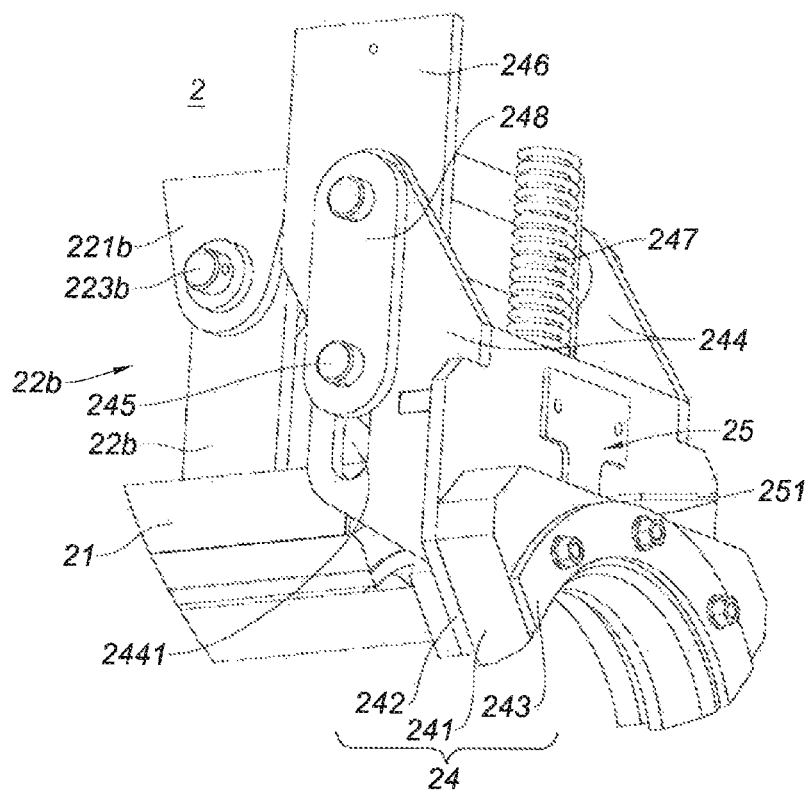
FIG. 6 is a perspective view of the positioning fork.

FIG. 6 shows the assembly detail of the positioning fork 24 of the guide rail 2.

The fork 24, as described above, comprises the arch 241 supported by the support 242 sliding in the down/up direction in relation to the rail 2 to allow the pre-positioning of the fork 24 and then its final installation and the coupling of the guide rail 2 and the laid pipe To by the suction cup 21.

The support 242 carries the arch 241 and the two guide walls 244 are provided with two holes 2441. The parallel holes 2441 are orientees in the up/down direction which is in general the vertical direction; this orientation is perpendicular to rail 2. The two walls 244 overlap the lugs 246 secured below the rail 2 and provided with two pins 245 passing through the holes 2441 and guiding them.

The fork 24, as described above, comprises the arch 241 supported by the support 242 sliding in the down/up direction in relation to the rail 2 to allow the pre-positioning of the fork 24 and then its final installation and the coupling of the guide rail 2 and the laid pipe To by the suction cup 21.

The support 242 carries the arch 241 and the two guide walls 244 are provided with two holes 2441. The parallel holes 2441 are orientees in the up/down direction which is in general the vertical direction; this orientation is perpendicular to rail 2. The two walls 244 overlap the lugs 246 secured below the rail 2 and provided with two pins 245 passing through the holes 2441 and guiding them.

A clip 248 opens each wall 244 to hold the head of each pin 245 and not obstruct the sliding fiber of the support 242 in relation to the two pins 245.

Figure 7:
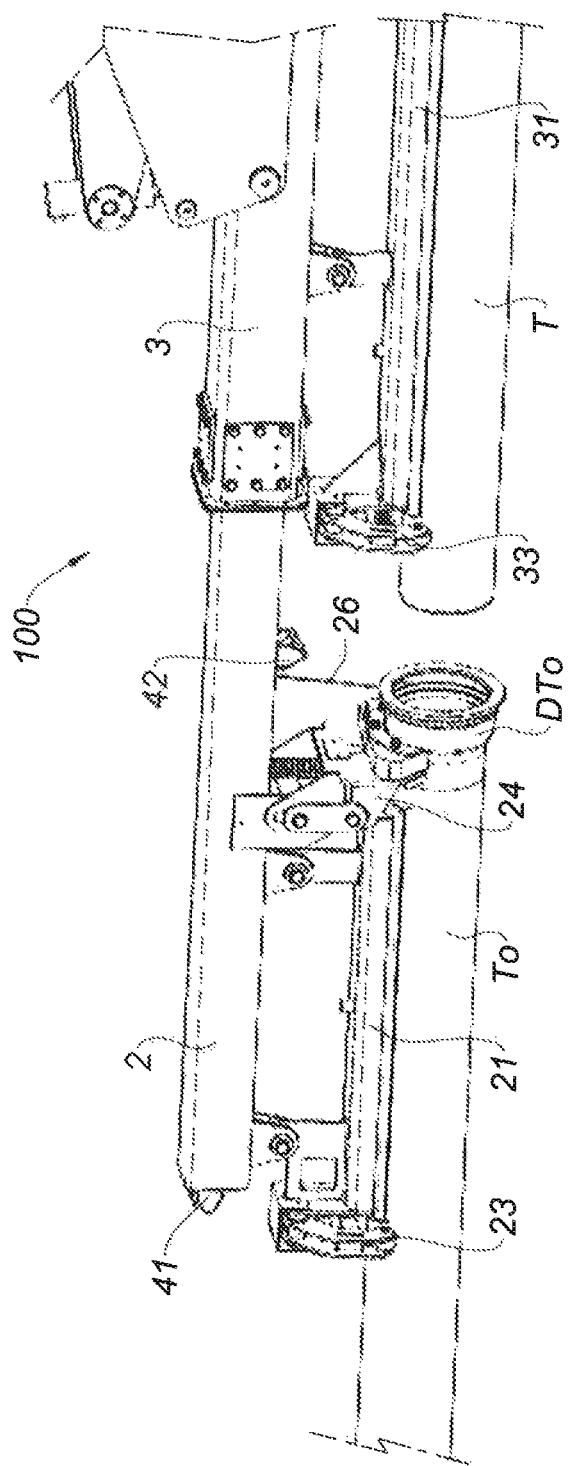
FIG. 7 is a partial perspective view of the device at the positioning rail placed on the leg pipe and on the pipe to be laid, aligned on the positioning pipe.

The assembly of the bracket 242 on the lugs 246 is removable to allow its replacement and adapt it to the section of pipes to be laid. FIG. 7 is a similar view to FIG. 4B but showing the installation of the guide rail 2 at the end of the laid pipe To. The positioning fork 24 is placed behind the socket fitting DTo of the pipe To whose opening plane (perpendicular to the LoLo axis) passes over the end 251 of the index 25. The suction cup 21 is attached to the top of the pipe To so that the rail 2 is locked in this aligned position, with the LoLo and LL axes coinciding.

The carrier 3 which may have moved backwards to leave more room in front of the pipe To is now moved forward as far as the stop 26. The tight-fitting phase of pipe T can begin.

FIGS. 8A-8F show different steps for fitting the pipe T and connecting it to laid pipe To.

Figure 8A:
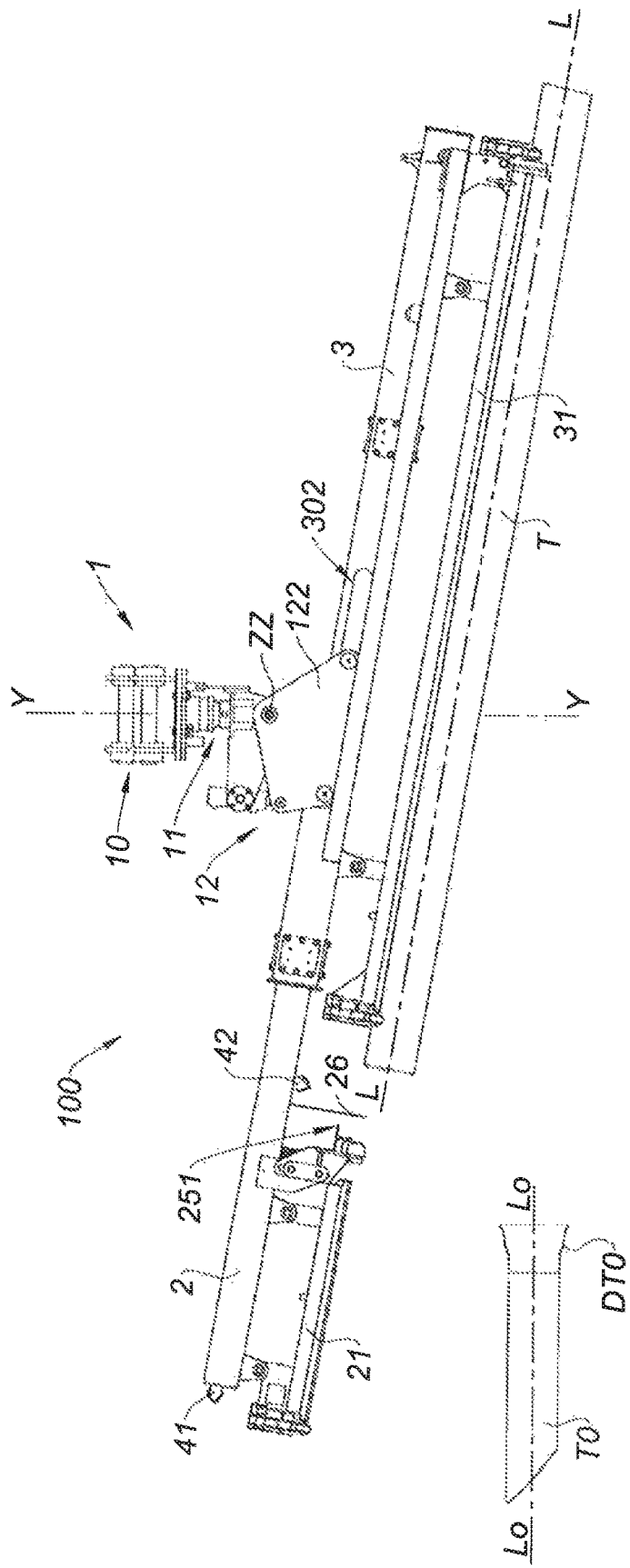
FIG. 8A.
Figure 8B:
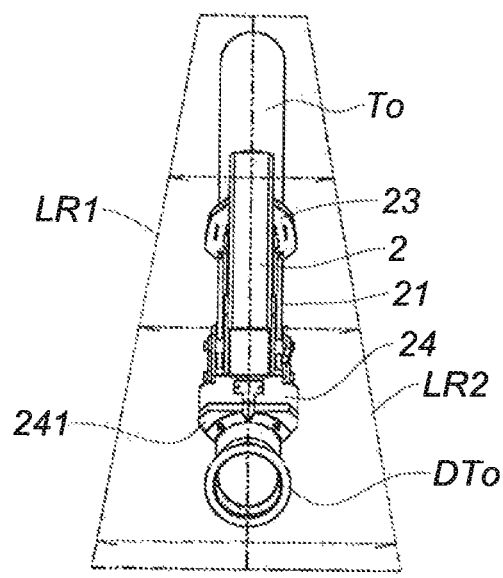
FIG. 8B are different views showing the positioning phases of the device and the supported pipe facing a laid pipe.

FIG. 8A shows the initial phase of positioning the device 100 bearing the pipe T. The device 100 is lowered using the swiveling arm of the machine by controlling the alignment of the LL axis to bring it into a coaxial position with the LoLo axis of the pipe To. The movement is controlled by sight using the camera image 41 on the control screen (FIG. 8B).

Figure 8C:
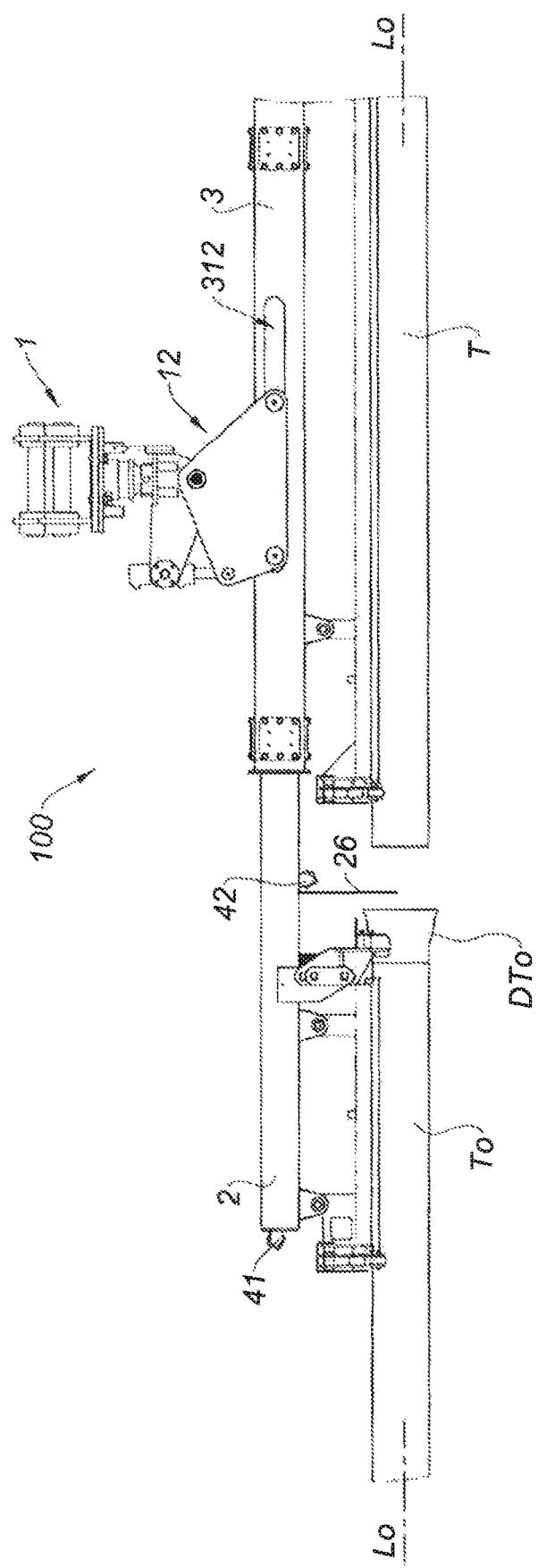
FIG. 8C is a schematic view of one side of the positioning device on the laid pipe and presenting the pipe to be laid in front of it.

The reference lines LR1, LR2 inlayed on the image are used for guiding the rail 2 to align it with the vertical plane of the laid pipe To and obtain the pre-positioning as shown in FIG. 8C.

Then, using the image from the second camera 42 directed in front of the opening DTo of the pipe To, the accurate alignment of the LL axis is aligned the LoLo axis. The monitor screen shows the image just before the arch 241 reaches the pipe To behind the socket fitting DTo.

Figure 8D:
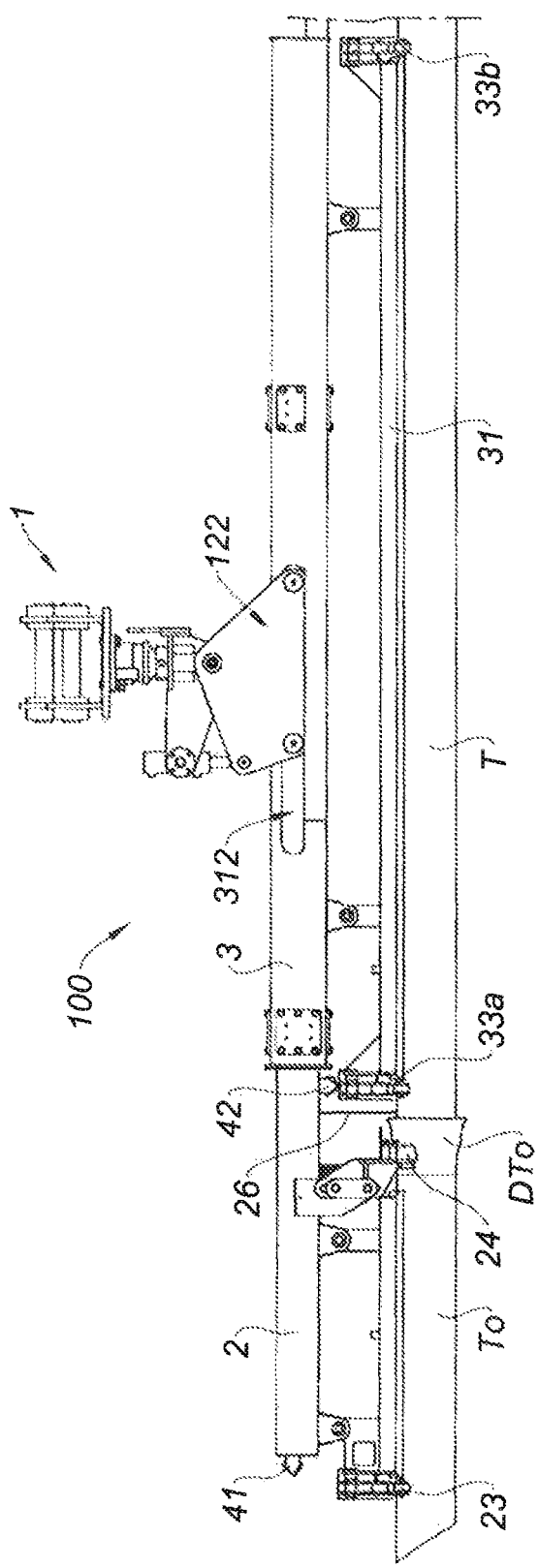
FIG. 8D is a side view of the result of pipe assembly.

The rail 2 is then lowered and tight-fitting can begin as per the set distance from the initial reference position shown by the reference 26 (FIG. 8D).

Figure 9:
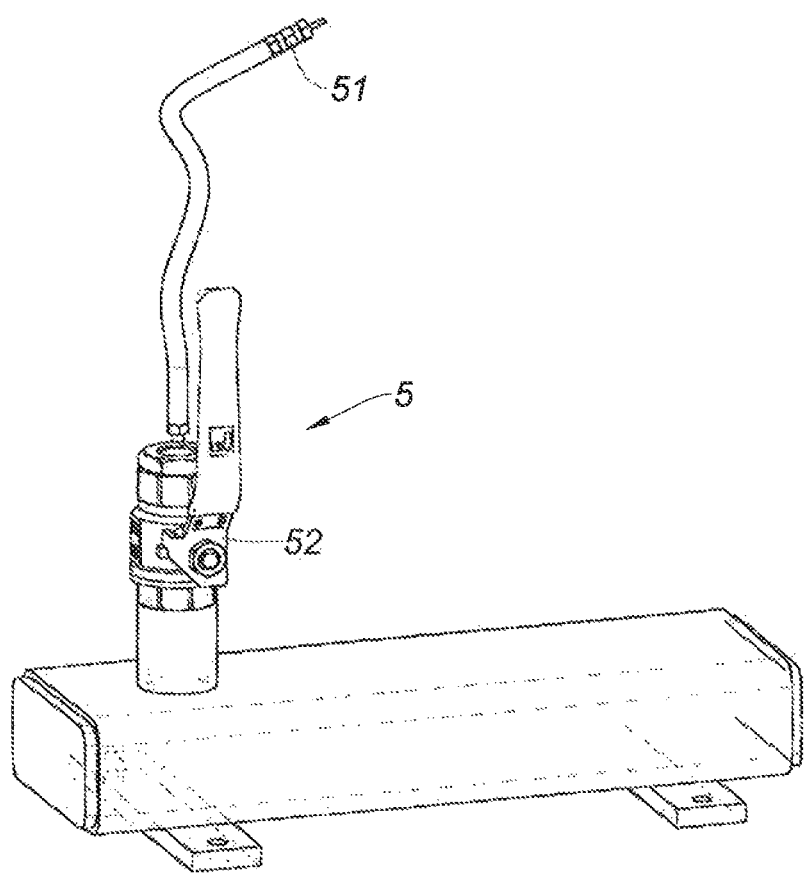
FIG. 9 is a perspective view of the coupling joint inspection means.

FIG. 9 is a view of the inspection means 5 for checking the integrity of the seal of socket fitting DTo after tight-fitting. To do this, a syringe 51 is attached in a hole in the seal a vacuum is generated in the seal using the valve 52 connected to the vacuum source used by suction cups 21, 31. The inspection means 5 is installed on the guide rail so that it is close to the socket fitting DTo when the pipe T is assembled.

If the vacuum is maintained, it means that the seal is intact. In the opposite case this means that the seal is damaged, and the installation of the pipe T must be done over again, after replacing the damaged seal of the pipe To socket fitting DTo.

Figure 10:
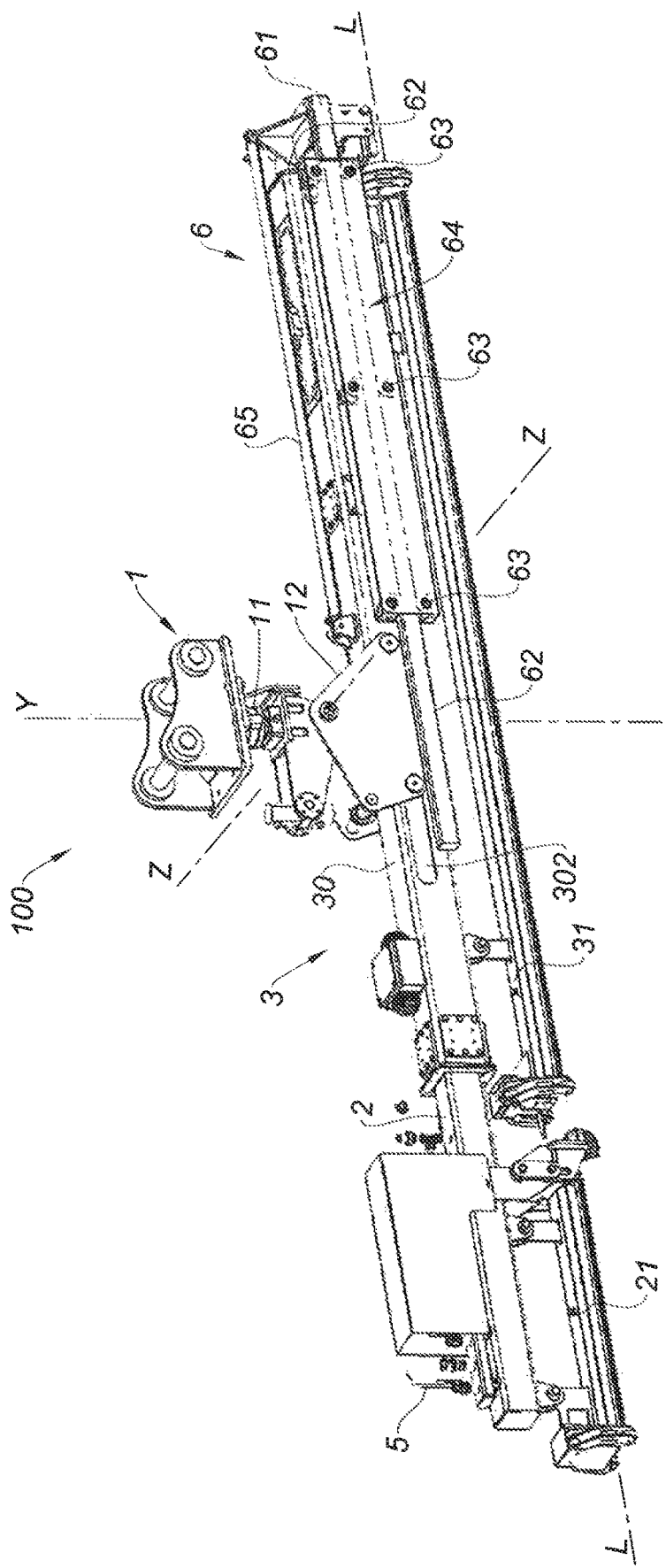
FIG. 10 is a perspective view of an example of the positioning device and its various components.

FIG. 10 is a more detailed perspective view of the laying device 100 fitted with a support boom 6 designed to help support relatively large diameter pipes that are longer than those which correspond substantially to the length of the carrier 3. The support boom 6 consists of a support 61 carried by two side bars 62 each guided in pairs of rollers 63 fixed to both sides of the telescopic tube and covered by a cover or forming a case 64 integral with the telescopic tube 30 of carrier 3. The boom 6 is operated by an actuator 65 installed on the top of the tube 30 and connects to the support 61. In this embodiment of the laying device 100 the pneumatic equipment, in particular the suction cup 21, 31 depression solenoids, are fitted to the top of the rail 2 as well as an indicator light 7 and the sealing inspection device 5.

PARTS LIST 100 pipe laying device
1 Coupling head
10 Attaching device
101 Plate
102 Wall
103 Stud
11 Swiveling point
11 *a* First part
11 *b* Second part
11 *c* Stop 11d counter-stop
12 Swiveling link
121 First arm
121a Plate
122 Second arm
122a Plate
1221, 1222 attachment points
123 Connecting pin
124 Plate
125 Actuator
125a Pin
125b Pin
1251 Actuator body
1252 Actuator rod
2 Guide rail
2AV Front end
2AR Rear end
21 Suction cup
211 End fitting
214 Rigid top
215 Sealing lip
22, 22a,b Fasteners
221a,b Double lug
222a,b Suction cup lug
223a,b Pin
23a Front guide
23b Rear Guide
231 Swiveling hanger arm
232 Blade
233 Roller
24 Positioning fork
241 Arch
242 Support
243 Counter-arch
244 Guide plate
2441 Hole
245 Pins
246 Lug
247 Compression spring
248 Clip
25 Index
251 Tip
26 Stop
3 Tubular carrier
30 Telescopic tube
30a Telescopic tube
301 Bearings
301AV Front bearing
301AR Rear bearing
302 Hole
303 Actuator
31 Suction cup
311 Union
314 Rigid top
315 Sealing lip
32, 32a,b attachments
321a,b Double lug attached to the carrier
322a,b Suction cup lug
323a,b Pin
33a,b Guide forks/front guide/rear guide
331 Swiveling hanger arm
332 Blade
333 Roller
41 Front camera
42 Intermediate camera
5 Inspection means
51 Syringe
52 Valve
6 Support boom
61 Support
62 Bars
63 Pairs of rollers
64 Edge
65 Actuator
7 Indicator light
F Swiveling arm/jib
V Arm actuator
YY Vertical swiveling axis
ZZ Tilting horizontal axis
XX Axis perpendicular to YZ plane
T pipe to be laid
To laid pipe
DTo laid pipe socket fitting
LL axis of pipe to be laid
LoLo axis of laid pipe

The invention claimed is:

1. A pipe laying device (100), connected to a jib (F) of a transport machine and carrying a pipe to be laid (T) for tight-fitting into a laid pipe (To), the pipe laying device (100) comprising:
a coupling head (1) having a swivel joint (11) having a vertical axis (YY) and a tilting link (12) having a horizontal axis (ZZ),
a guide rail (2) having a support (21) to position and attach to an end of the laid pipe (To) and to align the pipe to be laid (T) with the laid pipe (To),
a carrier assembly (3) comprising
a telescopic tube (30), which telescopic tube (30) is tight-fitted to the guide rail (2) and operates in relation to the guide rail (2), and
a support (31) fitted with the telescopic tube (30), the support (31) bearing the pipe to be laid (T),
wherein the pipe to be laid (T) is to be tight-fitted into a socket fitting (DTo) of the laid pipe (To) when the pipe to be laid (T) is laid,
wherein the guide rail (2) connects to the coupling head (1) through the telescopic tube (30).

2. The pipe laying device (100) according to claim 1, wherein the guide rail (2) is connected to the coupling head (1) through at least one hole (302) made in the telescopic tube (30) of the carrier assembly (3).

3. The pipe laying device (100) according to claim 2, wherein for support on the guide rail (2), the telescopic tube (30) has a sleeve bearing (301AV) at an entrance and a sleeve bearing (301AR) beyond the hole (302), before an end of the guide rail (2) corresponding to a maximum extension position of the telescopic tube (30) in relation to the guide rail (2).

4. The pipe laying device (100) according to claim 1, wherein the guide rail (2) and the telescopic tube (30) have a rectangular cross-section, and wherein two lateral sides (30a) of the telescopic tube (30) each comprise a hole (302) for attaching the guide rail (2) to the coupling head (1) through the holes (302).

5. The pipe laying device (100) according to claim 4, wherein the guide rail (2) and the telescopic tube (30) have a square cross-section.

6. The pipe laying device (100) according to claim 1, wherein beyond the support (21) on the carrier assembly (3) side, the guide rail (2) has a positioning fork (24) with an arch (241) to move behind the socket fitting (DTo) of laid pipe (To) and guide precise positioning of the support (21) near the end of the laid pipe (To), the support (21) comprising a suction cup (21).

7. The pipe laying device (100) according to claim 6, wherein the positioning fork (24) is connected to the guide rail (2) by a link with holes (2441) and a compression spring (247) to apply the arch (241) to the laid pipe (To) and guide downward movement of the guide rail (2) and the support (21) for positioning the rail (2) and attaching the rail (2) to the laid pipe (To) by hooking the suction cup (21) on the laid pipe (To).

8. The pipe laying device (100) according to claim 7, wherein the positioning fork (24) bears an index (25) to position the guide rail (2) axially with respect to an entrance plane of the laid pipe (To).

9. The pipe laying device (100) according to claim 1, wherein the support (21) of the rail (2) and the support (31) of the carrier assembly (3) each have an attaching device comprising a suction cup each connected to a controlled depression source, wherein each of the suction cups (21, 31) is suspended under the rail (2) and under the telescopic tube (30) of the carrier assembly (3) respectively by two attachments (22a,b, 32a,b) providing a degree of freedom and forming a transverse swivel with limited amplitude.

10. The pipe laying device (100) according to claim 9, wherein each of said two attachments (22a,b, 32a,b) comprises a double lug (221a,b, 321a,b) through which a pin passes, and is fixed respectively to the rail (2) and the tube (30), and to which are attached a lateral tilting device, a lug (222a,b, 322a,b) and respectively the suction cups (21, 31) by a pin (223a,b, 323a,b).

11. The pipe laying device (100) according to claim 1, wherein the coupling head (1) comprises: the swivel joint (11) with the vertical axis (YY) comprising two parts (11a, 11b), a first part (11a) of said two part being attached to the attaching device (10) connected to the carrier assembly (3), a second part (11b) of said two parts being attached to the tilting joint (12), wherein the tilting joint (12) includes two arms (121, 122) connected by a horizontal (ZZ) connecting link (123), a first arm (121) of said two arms being integral with the second part (11b) of the swivel joint (11), a second arm (122) of said two arms being integral with the guide rail (2), and with the two arms (121, 122) being connected by an actuator (125).

12. The pipe laying device (100) according to claim 11, wherein the horizontal connecting link (123) is a pin (123), wherein the first arm (121) comprises two plates (120a) connected by the second part (11b) of the swivel joint (11) and a pin (125a) bearing the actuator (125) and by the pin (123), the second arm (122) comprising two plates (122a) connected to the pin (123) and with a pin (125b) of the actuator (125), the two plates (122a) being secured to the guide rail (2) through the telescopic tube (30) while leaving clear passage for telescopic movement of the tube (30) of the carrier assembly (3).

13. The pipe laying device (100) according to claim 1, wherein the telescopic tube (30) houses an actuator (314) resting on the rail (2) and controlling the movement of the carrier assembly (3).

14. The pipe laying device (100) according to claim 1, wherein the guide rail (2) has a front camera (41) and an end of the telescopic tube (30), at its entrance point receiving the guide rail (2), has an intermediate camera (42), wherein the front camera (41) provides an image of the laid pipe (To) so as to align the guide rail (2) with it the laid pipe (To), and the intermediate camera (42) provides an image of the socket fitting (DTo) of the laid pipe (To) to check the engagement of the pipe to be laid (T) in the socket fitting (DTo) of the laid pipe (To).

15. The pipe laying device (100) according to claim 1, wherein the telescopic tube (30) is fitted with a support boom (6) at an end opposite that receiving the guide rail (2), the boom (6) having a support (61) carried by two lateral bars (62) engaged in pairs of rollers (63) supported by two sides of the telescopic tube (30) and an actuator (65) installed on the telescopic tube (30) and connected to the support (61).

16. The pipe laying device (100) according to claim 1, further comprising a geolocation device for the guide rail (2) and the carrier assembly (3) to localize and record position of the pipe to be laid (T) once the pipe to be laid (T) has been laid, and record a line made by the laid pipe (To) and the laid pipe to be laid (T) and a function thereof.

17. The pipe laying device (100) according to claim 1, wherein the support (21) of the guide rail (2) is positioned above the laid pipe (To), and wherein the support (31) of the carrier assembly (3) is positioned above the pipe to be laid (T).

* * * * *